US010225533B2

(12) United States Patent
Wetzler et al.

(10) Patent No.: US 10,225,533 B2
(45) Date of Patent: Mar. 5, 2019

(54) STRUCTURED LIGHT GENERATION AND PROCESSING ON A MOBILE DEVICE

(71) Applicant: Technion Research and Development Foundation Limited, Haifa (IL)

(72) Inventors: Aaron Wetzler, Haifa (IL); Ron Kimmel, Haifa (IL)

(73) Assignee: Technion Research and Development Foundation Limited, Haifa (IL)

( * ) Notice: Subject to any disclaimer, the term of this patent is extended or adjusted under 35 U.S.C. 154(b) by 191 days.

(21) Appl. No.: 14/680,461

(22) Filed: Apr. 7, 2015

(65) Prior Publication Data
US 2015/0288938 A1    Oct. 8, 2015

Related U.S. Application Data

(60) Provisional application No. 61/976,518, filed on Apr. 8, 2014.

(51) Int. Cl.
| | |
|---|---|
| *H04N 5/225* | (2006.01) |
| *H04N 9/31* | (2006.01) |
| *G02B 7/00* | (2006.01) |
| *G02B 7/18* | (2006.01) |
| *H04N 5/74* | (2006.01) |
| *G02B 5/04* | (2006.01) |

(52) U.S. Cl.
CPC .......... *H04N 9/3176* (2013.01); *G02B 7/003* (2013.01); *G02B 7/1805* (2013.01); *H04N 5/2254* (2013.01); *H04N 5/7416* (2013.01); *H04N 9/3173* (2013.01); *H04N 9/3194* (2013.01); *G02B 5/04* (2013.01)

(58) Field of Classification Search
CPC .................................................... H04N 9/3176
USPC ......................................................... 348/337
See application file for complete search history.

(56) References Cited

U.S. PATENT DOCUMENTS

| | | | | |
|---|---|---|---|---|
| 2002/0001134 | A1* | 1/2002 | Shinoda | ................... G02B 5/04 359/627 |
| 2004/0070695 | A1* | 4/2004 | Kim | ..................... H04N 9/3141 348/782 |
| 2005/0264765 | A1* | 12/2005 | Yang | ...................... G03B 21/26 353/37 |
| 2011/0115880 | A1* | 5/2011 | Yoo | .................... H04N 13/0022 348/42 |
| 2014/0118704 | A1 | 5/2014 | Duelli et al. | |
| 2014/0293064 | A1* | 10/2014 | Kimura | ................. G01S 3/7864 348/169 |
| 2015/0036023 | A1* | 2/2015 | Gilbert | ................. H04N 5/2256 348/234 |
| 2015/0085155 | A1* | 3/2015 | Diaz Spindola | ...... G06T 19/006 348/222.1 |

FOREIGN PATENT DOCUMENTS

WO      2014015454 A1    1/2014

* cited by examiner

*Primary Examiner* — Joel W Fosselman
(74) *Attorney, Agent, or Firm* — Roach Brown McCarthy & Gruber, P.C.; Kevin D. McCarthy

(57) ABSTRACT

A system comprising: a handheld mobile device comprising: a projector unit configured to project an image; a camera; and a prism configured to reflect the image projected by the projector such that the camera can capture the projected image.

6 Claims, 6 Drawing Sheets

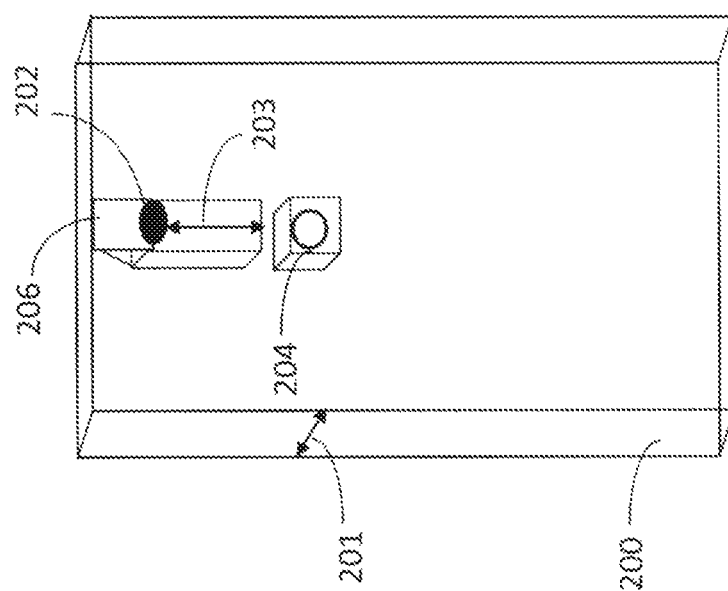

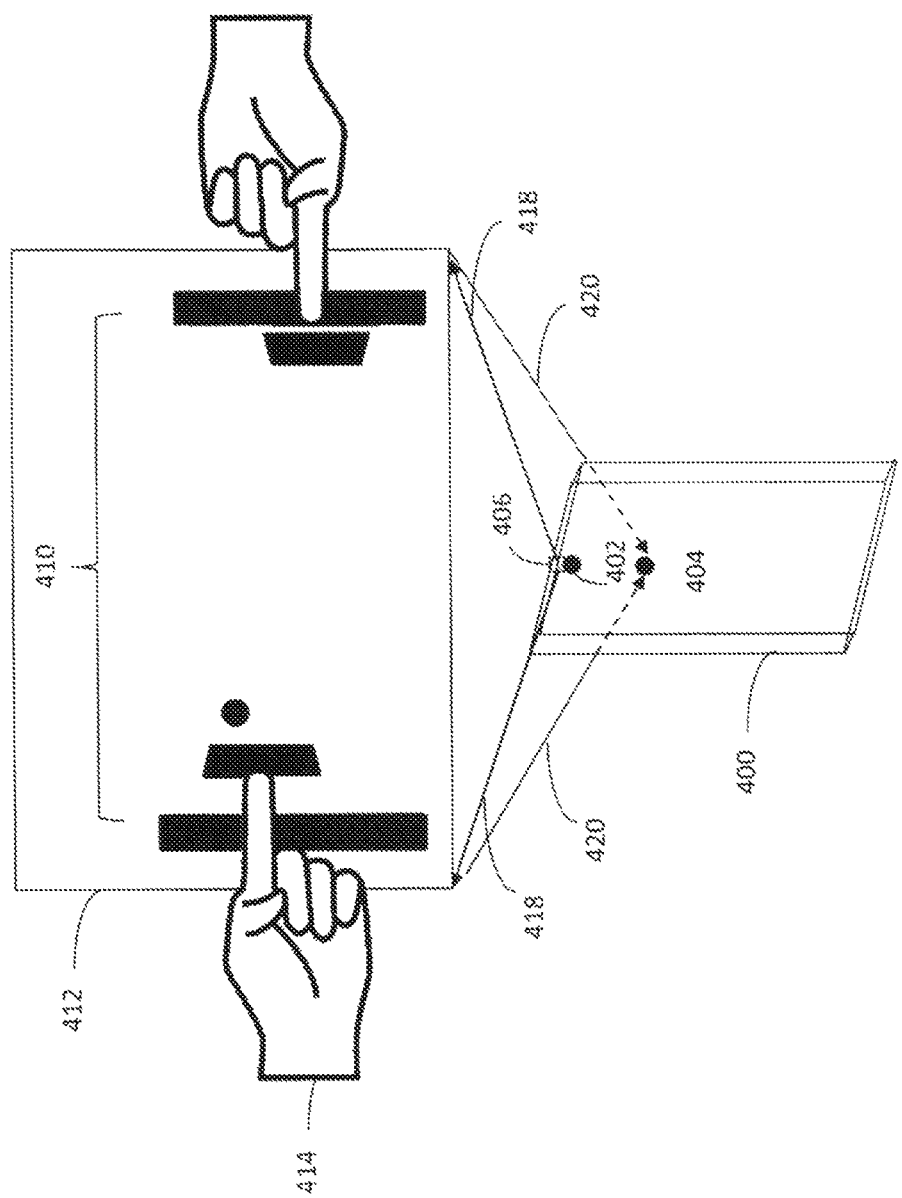

STRUCTURED LIGHT GENERATION AND PROCESSING ON A MOBILE DEVICE

CROSS-REFERENCE TO RELATED APPLICATIONS

This application claims the benefit of GB Patent Application No. 1406385.3 filed Apr. 9, 2014 and entitled "Structured Light Generation and Processing on a Mobile Device"; and of U.S. Provisional Patent Application No. 61/976,518, filed Apr. 8, 2014 and entitled "Structured Light Generation and Processing on a Mobile Device". The contents of these two applications is incorporated herein by reference.

FIELD OF THE INVENTION

The invention relates to the field of handheld mobile devices.

BACKGROUND

Structured light projectors and high resolution cameras are powerful tools in computational photography, computer vision and systems which enable human-computer interaction. Recently both components (projector and camera) have become widely available in mobile devices (for example Samsung Beam). Various physical, technological and aesthetic limitations of current projectors require that their optical axis be aligned along the length of the body of a mobile device such as a smart phone. In contrast to this the useful optical axis of front and back facing cameras are aligned perpendicular to this axis.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising: a handheld mobile device comprising; a projector unit configured to project an image; a camera; and a prism configured to reflect the image projected by the projector such that the camera can capture the projected image.

In one embodiment, the system further comprises an integrated circuit configured to process the image captured by the camera to detect an activity depicted on the captured image.

In one embodiment, the prism is mounted wholly within the handheld mobile device.

In one embodiment, the prism is mounted at least partially outside the handheld mobile device.

In one embodiment, the prism is right-angle prism.

In one embodiment, the prism is pentaprism.

In one embodiment, the camera is positioned to have an optical axis that is parallel to a depth axis of the device, and wherein the projector is positioned to have an optical axis that is perpendicular to the optical axis of the camera, and wherein the reflective surface is configured to align the optical axis of the projector with the optical axis of the camera.

In one embodiment, the length of the projector is at least one centimeter.

There is provided, in accordance with an embodiment, a projection feedback system comprising: a prism configured to align a projection axis of a projector with a recording axis of a camera, wherein the projector and the camera are assembled with a handheld mobile device, wherein the projector is configured to project a first image within a projection field, and wherein the camera is configured to record the projection field; and a processor configured to identify an element within the recorded projection field, and select a predefined feedback action associated with the identification of the element.

In one embodiment, the prism is right-angle prism.

In one embodiment, the prism is pentaprism.

In one embodiment, the processor is configured, in accordance with the predefined feedback action, to configure a second image in preparation for projection of the second image by the projector.

There is provided, in accordance with an embodiment, a system for aligning an optical axis of a mobile device, the system comprising: a handheld mobile device; a projection unit that is configured with the mobile device to project an optical image; a prism that is configured with the mobile device to reflect the optical image by controlling the angle of the reflective surface, thereby aligning the optical axis of the projection unit; and a camera unit that is configured with the mobile device, wherein a viewing volume of the camera unit overlaps with a projection volume of the projecting unit.

In one embodiment, the prism is positioned directly above the projection lens in a manner to fully reflect the optical image.

In one embodiment, the prism is right-angle prism.

In one embodiment, the prism is pentaprism.

In one embodiment, an optical axis of the camera is parallel to a depth axis of the device, and wherein the optical axis of the projection unit is perpendicular to the optical axis of the camera, and wherein the prism is configured to align optical axis of the projection unit with the optical axis of the camera.

In one embodiment, the length of the projection unit is at least one centimeter.

There is provided, in accordance with an embodiment, a method for aligning an optical axis for a handheld mobile device, the method comprising: projecting an optical image over a projection volume; reflecting the projected optical image in a manner to align an optical axis of the optical image, wherein the alignment results in an overlap between a viewing volume and the projection volume; and capturing the optical image within the viewing volume, wherein the projecting, reflecting, and capturing steps are performed by the handheld mobile device.

In one embodiment, the method further comprises processing the captured optical image.

In one embodiment, the prism is right-angle prism.

In one embodiment, the prism is pentaprism.

In one embodiment, the aligned optical axis is parallel to a depth axis of the handheld mobile device, and wherein the optical image is projected at an optical axis that is perpendicular to the aligned optical axis.

In one embodiment, the optical image is projected by a projection unit that has a length greater than or equal to one centimeter.

There is provided, in accordance with an embodiment, a system comprising: a handheld mobile device comprising a camera; a projector accessory configured to: project an image, and operate with the handheld mobile device; and a prism configured to reflect the image projected by the projector accessory such that the camera can capture the projected image.

In one embodiment, the handheld mobile device further comprises an integrated circuit configured to process the image captured by the camera to detect an activity depicted in the captured image.

In one embodiment, the prism is mounted within a housing of the projector accessory.

In one embodiment, the prism is mounted at least partially outside a housing of the projector accessory.

In one embodiment, the prism is a right-angle prism.

In one embodiment, the prism is a pentaprism.

In one embodiment, the camera is positioned to have an optical axis that is parallel to a depth axis of the handheld mobile device, and wherein the projector accessory is positioned to have an optical axis that is perpendicular to the optical axis of the camera, and wherein the reflective surface is configured to align the optical axis of the projector accessory with the optical axis of the camera.

In one embodiment, the length of the projector accessory is at least one centimeter.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 2A-C illustrate front, side, and perspective views, respectively, of a system for aligning the optical axes of a projector with a camera, in accordance with another embodiment;

FIG. 4 illustrates an exemplary application using any of the systems of FIGS. 1A-C or 2A-C.

DETAILED DESCRIPTION

Figure 1B:
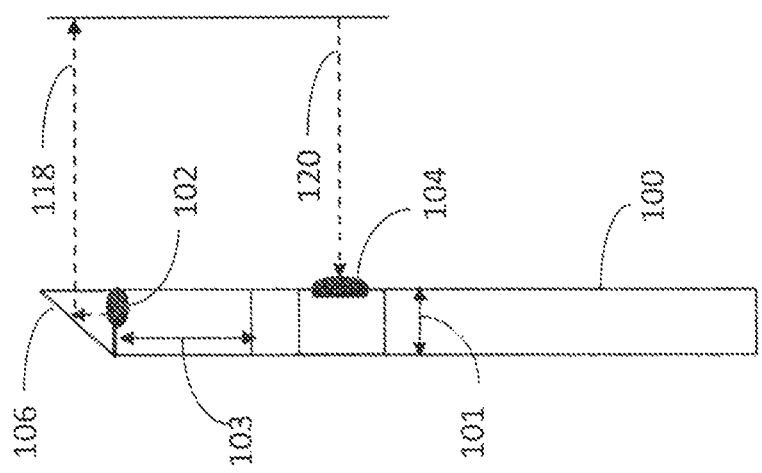
FIGS. 1A-C illustrate front, side, and perspective views, respectively, of a system for aligning the optical axes of a projector with a camera, in accordance with an embodiment.

A system and method are disclosed herein for aligning an inbuilt projection unit and camera provided with a handheld mobile device. The camera may be positioned to be either forward or backwards facing, and may have an optical axis parallel to the thickness of the device, whereas the projection unit may be longer than the thickness of the device, and thus, may be positioned to project at 90 degrees to the optical axis of the camera. A reflective surface may be provided to reflect the optical axis of the inbuilt projection unit, and thereby align the optical axes of the projection unit with that of the camera. The reflective surface may be implemented during construction of the mobile device as an addition to the internal components of the system. Alternatively, reflective surface may be implemented using an external attachment.

In an embodiment, the reflective surface may comprise a mirror. A control actuator, such as a geared motor, may be provided to control and/or adjust the angle of reflection of the optical axis of the projection unit, by choosing the angle of the reflective surface which then reflects the projection image.

The reflective surface may be positioned directly above the projection lens in such a way that the full projection beam is reflected. The reflective surface may be a flat reflecting mirror that is controlled about a pivoting hinge by the actuator. The hinge placement may be anywhere along the length of the mirror.

The invention enables alignment of the optical axis with either the forward or backward facing camera units in a modern mobile device in the sense that the projection volume of the projecting unit and the viewing volume of the camera unit overlap.

The camera and projector may be synchronized in accordance with conventional synchronization techniques, such as by synchronizing a trigger module of the camera unit with the refresh rate of the projector's output.

In an embodiment, a prism, such as a right angle prism, may be used to reflect and/or reflect the beam emitted by the projection unit. Alternatively, a pentaprism prism may be used to transmit the projection beam at 90 degrees regardless of the angle of incidence of the beam with the pentaprism, and without inverting the image, as would happen with a right-angle prism.

Use of a prism to reflect an emitted beam instead of a mirror may provide several advantages, some of which are listed below:

by encasing the prism's reflective surface in a crystal, the reflective surface is not exposed to and/or affected by particles of dust and moisture\condensation, the prism may be positioned to directly abut with the projector, to further reduce exposure to dust and moisture\condensation. Such positioning is not typically feasible with a mirror, a prism may reduce alignment errors typical of mirror-based systems which, due to the Law of Reflection, double any error due to misalignment of the mirror, the simplicity of a prism allows for greater consistency for a calibrated system as the problem of the accuracy of precise 90 degree beam alignment is almost completely eliminated, a prism offers cheap, reliable solution in an industrial mass production environment of a fixed optical system, a suitably oriented prism may provide greater efficiency over a mirror by reflecting the beam within the prism using Total Internal Reflection (TIR) thereby reducing signal loss typical of inexpensive, standard mirrors, a prism intrinsically provides greater thermal stability over mirrors by being naturally athermalized, and expand and contract uniformly with a given temperature change. Conversely, a mirror mounted on a mount comprising different metal parts may be more prone to misalign with a change in temperature, a prism may allow for simple and reliable beam rotation by rotating the prism about an axis parallel to the incoming beam.

Thus, using a prism instead of a mirror to reflect the beam emitted from the projector and align it with the optical axis of the camera may:

improve performance over that of a mirror, by reducing signal loss, and improve reliability by reducing alignment errors typical of mirrors, and increasing thermal stability, and improve reliability by reducing exposure to dust particles and/or moisture\condensation typical of mirrors.

Figure 1A:
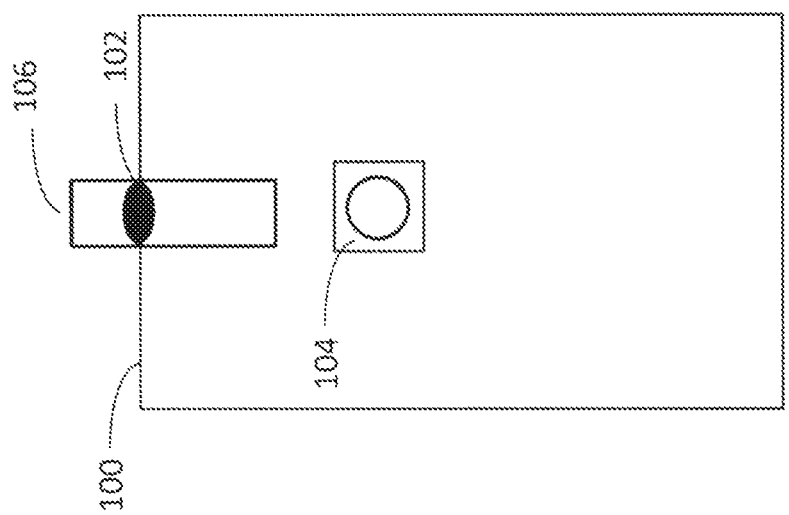
Figure 1C:
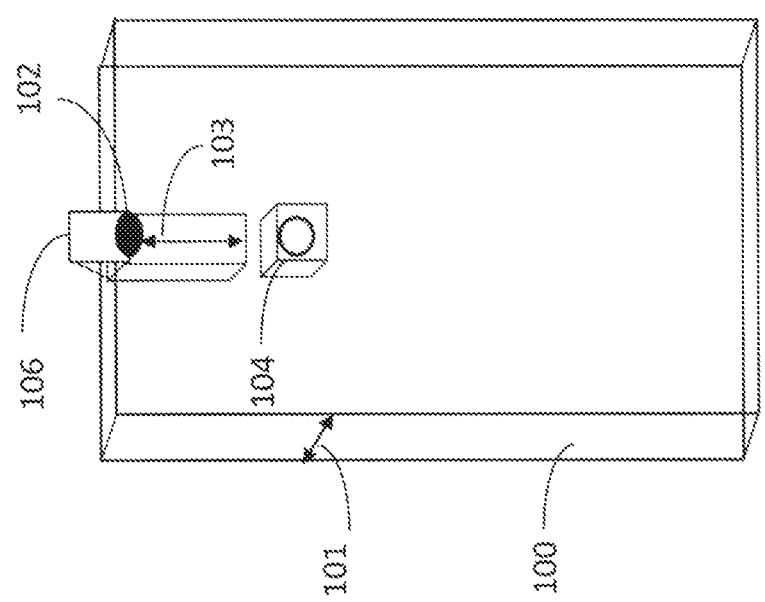

Reference is now made to FIGS. 1A-C which illustrates front, side, and perspective views, respectively, of a system for aligning the optical axes of a projector with a camera, in accordance with an embodiment. A handheld mobile device 100 may be provided with a projection unit 102 configured to project an image, and a front and/or rear facing camera 104 positioned within the body of device 100. Projection unit 102 may be positioned to have its optical axis lie primarily in the longitudinal plane of the body of device 100, such as due to a size constraint of projection unit 102. For example, projection unit 102 may be substantially longer than the thickness, or depth, of the body of device 100. In one embodiment, the length 103 of projection unit 102 may be at least one centimeter.

Front and/or rear facing camera 104 may be positioned to have its optical axis lie substantially parallel to a depth axis 101 corresponding to the thickness of the body of device 100, and orthogonal to the longitudinal and lateral planes of device 100. Thus, the optical axis of projection unit 102 may be substantially perpendicular to the optical axis of camera 104. In one embodiment, camera 104 and projector 102 are embodied in the same housing of device 100.

An externally positioned reflective unit 106, such as comprising a prism with an internal reflective surface, may be disposed above projection unit 102 to reflect an image projected by projection unit 102, such as via a beam 118, to align the optical axis of projection unit 102 with the optical axis 120 of camera 104 such that the camera can capture the image. Reflective unit 106 may be mounted inside the housing of device 100, or alternatively, may be mounted outside of device 102 using a customized mount or other such attachment means.

Prism may 106 may comprise any suitable geometry for aligning the beam emitted from projection unit 102 with the optical axis of camera 104. For example, prism 106 may be a right angle prism as illustrated in FIGS. 1A-C. In another embodiment (not shown), prism 106 may be a pentaprism. The dimensions of prism 106 may be suitable for completely transferring the width and height of the incoming and outgoing beam from the projector and camera optical fields. For example, the prism dimensions may match a light beam ranging from 0.5-10 millimeters (mm).

Prism 106 may comprise a crystal made of any suitable material, such as glass, plexiglass, or plastic. In an embodiment, the reflective surface of prism 106 may be at approximately 45 degrees to the entry plane of the prism, or the side of the prism into which the beam is projected, resulting in a 2*45=90 degree redirection of the projection path of the beam. The refractive index of prism 106 may be sufficient to allow total internal reflection of the beam within prism 106, such as $n > \sqrt{2}$, or approximately 1.414 for a glass/air interface.

A similar refractive index may be chosen for a prism disposed with a mirror-coated reflective surface, such as may be provided with a pentaprism.

Figure 2B:
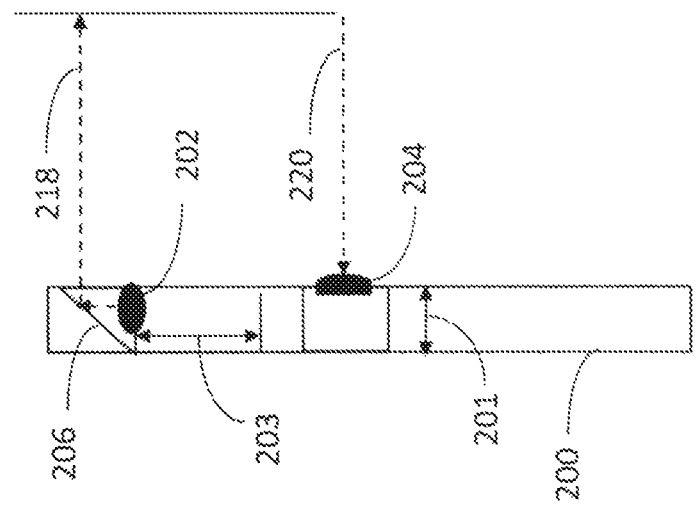
Figure 2A:
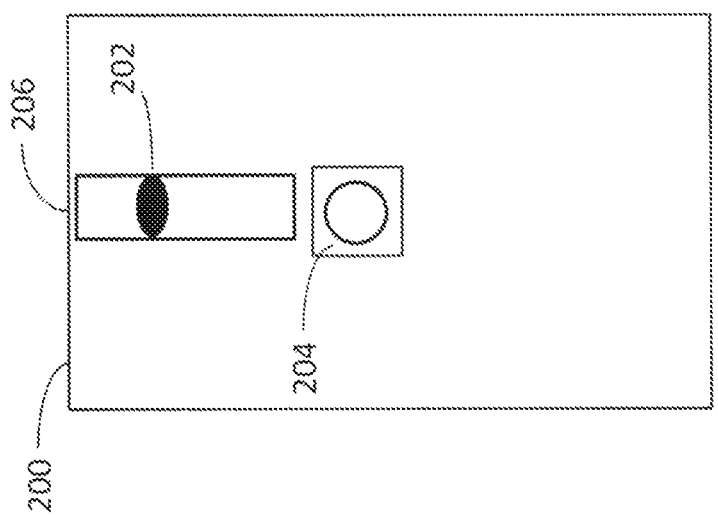

In an embodiment, device 100 may include integrated circuitry (not shown), such as a processor, to process the image captured by camera 104 to detect a human on the image Reference is now made to FIGS. 2A-C which illustrates front, side, and perspective views, respectively, of a system for aligning the optical axes of a projector with a camera, in accordance with another embodiment. The system of FIG. 1B is substantially similar to the system of FIG. 1A with the notable difference that reflective unit 206, corresponding to unit 106, may be disposed within the body of mobile device 200 so that it does not extend the length of the body of mobile device 200.

In one embodiment, any of the systems of FIGS. 1A-C and/or FIGS. 2A-C may be used as a projection feedback system. The projector and the camera may be assembled or otherwise provided with a handheld mobile device, and the prism may be configured to align a projection axis of the projector with the recording axis of the camera. The projector may project a first image within a projection field, and the camera may be configured to record the projection field, and thus the first image projected by the projector. A processor may be provided with the device to identify an element, such as may be associated with a human, animal, robotic, or other external activity, within the recorded projection field, and select a predefined feedback action associated with the identification of the element. The processor may configure a second image in preparation for projection of the second image by the projector, in accordance with the predefined feedback action.

In another embodiment, any of the systems of FIGS. 1A-C and/or FIGS. 2A-C may be used for aligning an optical axis of the handheld mobile device. The prism configured with the mobile device may reflect the optical image projected by the projection unit by controlling the angle of the reflective surface, and align the optical axis of the projection unit with the camera unit. This may cause the camera's viewing volume to overlap with the projection volume of the projecting unit. The prism may be positioned directly above the projection lens in a manner to reflect the full projection beam onto the viewing volume of the camera.

Figure 3:
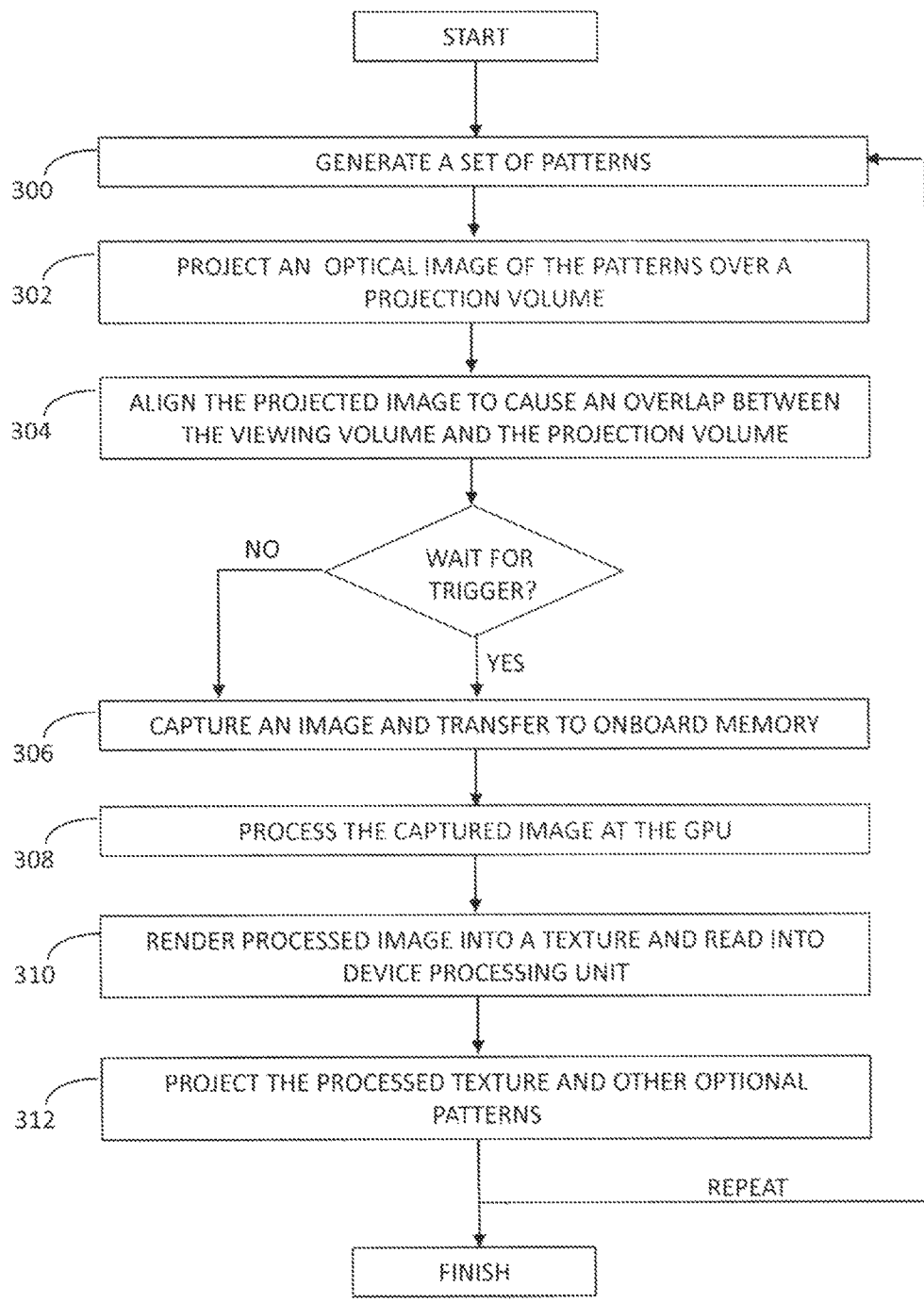
FIG. 3 illustrates a flowchart of a method for using any of the systems of FIGS. 1A-C or 2A-C.

Reference is now made to FIG. 3 which shows a flowchart of a method for using the system described hereinabove. The method may not require additional specialized hardware and processing units and may take advantage of the existing Graphical Processing Unit (GPU) hardware and computing standards to allow high processing speed using conventional general purpose GPU processing techniques. The OpenGL ES shader language may be employed to take advantage of the onboard GPU of modern mobile devices. This may provide highly efficient mapping of the parallizable elements of the computational pipeline on the mobile device's GPU, which may remove the necessity for additional hardware for such processing and increase the rate at which results are computed.

Projected images of known patterns on a mobile device may be captured and processed. In one such implementation, a set of patterns relevant to a particular application may be generated on one of the device's processors (Step 300). The pattern may be projected as an optical image over a projection volume of a projection unit, by pushing to the device screenbuffer or, if different, to the projector's screenbuffer (Step 302). The projected optical image may be reflected, such as by using a prism, in a manner to align an optical axis of the optical image, where the alignment may result in an overlap between a viewing volume of the camera, and the projection volume of the projector (Step 304). The method continues by optionally waiting for a trigger signal to the camera unit from the refresh signal of the projector, and capturing the projected image within the camera's viewing volume, and transferring it directly to the device's onboard memory (Step 306). The captured image together with any number of other additional parameters may be passed to the GPU memory for processing. An image sized screen quad may be drawn to a GPU context and fragment shaders may be used to perform per pixel processing operations (Step 308). The results of these operations may be rendered into a texture and read back to the device's host processing unit from the GPU (Step 310). The texture may be projected to display the results of the processing to the user, and further projection patterns and processing cycles may be repeated as necessary (Step 312). The method may terminate when no further processing using the structured light system is necessary.

In one implementation of the system and method described hereinabove the camera of a mobile device may record an image every 30 milliseconds and processes it to determine, in accordance with conventional techniques, whether a human interaction with the image is detected. The human interaction may then be interpreted, in accordance with conventional techniques, to determine whether the intent of the human interaction is intended to manipulate in some way the operation of the processing device and, if so this is implemented using conventional techniques, in accordance with the indicated human interaction.

Reference is now made to FIG. 4 which depicts an exemplary application of the invention in the context of an interactive "pong"-type game. In FIG. 4 a set of patterns 410 are projected, as illustrated by arrows 418, onto a projection field 412, such as a wall, by a projection unit 402 and a prism 406 provided with a mobile device 400. Prism 406 may cause the viewing volume of camera 404, illustrated by arrows 420, to overlap with the projection volume of projector 402, illustrated by arrows 418. The device's camera 404, optically aligned with projection unit 402 via a prism 406, records the image on the projection field 412, as illustrated by arrows 420, and which may include pattern 410 as well as an interference pattern by a human hand 414. The recorded image is processed as described above, and a response image is projected onto field 412 via projection unit 402 and prism 406, in accordance with the application.

In another implementation the system described hereinabove may be used in 3D structured light scanning applications where the mobile device described herein projects known patterns which are then recorded by the device's camera in a synchronized projection-capture cycle. The captured images may then be processed using conventional techniques to perform 3D reconstruction of part of the scene observed by the camera. This may include performing a calibration in accordance with conventional techniques to determine the exact relationship between the local frames of reference of the camera and projection units. Determining and adjusting for lens and projection distortion may also be performed using standard techniques.

Part of the patterns are used for processing, the other parts are used to display a game interface. Subsequently, any interference with the pattern by a user's hand may result in a change of reflected light received by the camera from the projection surface. This change may be processed and used to determine a new position for a user's paddle in the context of the game.

In another implementation, the projector may be provided separately from the mobile device as an accessory that is configured to operate with the device. The mobile device may be provided with a front and/or rear facing camera, as described above where the camera is positioned to have an optical axis that is parallel to a depth axis of the handheld mobile device.

The projector accessory may connect to the device using conventional means, such as via a USB connector configured for HDMI or MIPI format. In an embodiment, the projector accessory may be provided with a case that houses the phone and the projector accessory as a single hand held unit. The projector accessory may have similar dimensional constraints as above and may be positioned to have its optical axis perpendicular to the optical axis of the camera.

A prism may be provided, as described above, to reflect the image projected by the projector accessory such that the optical axis of the projector accessory is aligned with the optical axis of the camera, and the camera can capture the projected image. In one embodiment, the prism may be mounted within the case housing the projector accessory.

In another embodiment, the prism may be mounted at least partially outside the case housing the projector accessory.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A projection feedback system comprising:
a prism configured to align a projection axis of a projector with a recording axis of a camera, said prism being in abutting engagement with said projector,
wherein the projector and the camera are assembled with a handheld mobile device,
wherein the projector is configured to project a first image within a projection field, said first image comprising a set of patterns which are visible to humans, and
wherein the camera is configured to record the projection field; and
a processor configured to:
identify an interference by a user with at least part of said set of patterns of said first image within the recorded projection field, and
configure a second image for projecting by said projector, said second image comprising said set of patterns in a modified form, wherein the modified form of said set of patterns is visible to humans when projected by said projector, wherein said modification comprises changing, based on said identification, a position of at least a part of said set of patterns relative to said position in said first image.

2. The projection feedback system of claim 1, wherein the prism is a right-angle prism.

3. The projection feedback system of claim 1, wherein the prism is a pentaprism.

4. The projection feedback system according to claim 1, wherein the recording axis is parallel to a depth axis of the device, and wherein the projecting axis is perpendicular to the recording axis.

5. The projection feedback system of claim 4, wherein the length of the projector is at least one centimeter.

6. The projection feedback system of claim 1, wherein said interference comprises a hand gesture by said user.

* * * * *